(12) United States Patent
Onozawa et al.

(10) Patent No.: US 7,146,621 B2
(45) Date of Patent: Dec. 5, 2006

(54) OPTICAL PICKUP

(75) Inventors: Kazutoshi Onozawa, Osaka (JP); Daisuke Ueda, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 295 days.

(21) Appl. No.: 10/762,383

(22) Filed: Jan. 23, 2004

(65) Prior Publication Data

US 2004/0154033 A1    Aug. 5, 2004

(30) Foreign Application Priority Data

Jan. 23, 2003    (JP)    ............... 2003-014565

(51) Int. Cl.
*G11B 33/14*    (2006.01)

(52) U.S. Cl. ................................... 720/648
(58) Field of Classification Search ............... 720/648
See application file for complete search history.

(56) References Cited

U.S. PATENT DOCUMENTS 4,721,850 A * 1/1988 Sakai et al. ............... 369/44.31
6,534,794 B1 * 3/2003 Nakanishi et al. ............ 257/79
2004/0223423 A1 * 11/2004 Tsuda ........................ 369/44.16

FOREIGN PATENT DOCUMENTS

| JP | 55-150586 A | 11/1980 |
| JP | 61-272954 | 3/1986 |
| JP | 11-339291 | 12/1999 |
| JP | 2000-57602 | 2/2000 |
| JP | 2001-344783 | 12/2001 |
| JP | 2001-344783 A | 12/2001 |

* cited by examiner

*Primary Examiner*—Tianjie Chen
(74) *Attorney, Agent, or Firm*—McDermott Will & Emery LLP

(57) ABSTRACT

An inventive optical pickup includes: a base; a movable part; a fixed part; and a first yoke. The movable part, fixed part and first yoke are provided over the base. The movable part is provided with: a hologram element; a package equipped with a laser/photodetectors integrated element in which a semiconductor laser and photodetectors are integrated; and an objective lens. A magnet is provided on each of second yokes provided on the base, and a heat dissipating medium is provided in a gap between a package metal section of the package and another magnet.

7 Claims, 4 Drawing Sheets

OPTICAL PICKUP

BACKGROUND OF THE INVENTION

The present invention relates to an optical pickup for optical disks, and more particularly to an optical pickup having a movable part equipped with an objective lens, a laser diode and photodetectors.

In recent years, optical storage media, such as a compact disc (CD) and a digital versatile disk (DVD), are rapidly becoming in widespread use. An optical pickup is usually used as a device that performs a read from and a write onto such an optical storage medium.

FIG. 7 shows a construction of a conventional optical pickup 400 in a longitudinal cross-sectional view. As shown in FIG. 7, the optical pickup 400 has a movable part 406 which is equipped with an objective lens 401 and coils 405. A fixed part supports the movable part 406 almost horizontally via four wires 421 which are positioned in parallel to one another. The fixed part 407 is fixed onto an optical base 409.

Since FIG. 7 is the longitudinal cross-sectional view obtained by vertically cutting the optical pickup 400, two out of the four wires 421 are not shown in FIG. 7. In addition to the fixed part 407, the optical base 409 is equipped with: a yoke 410 holing a magnet 411; an integrated component 402; a collimator lens 420; and a mirror 403. The integrated component 402 contains a semiconductor laser and photodetectors. The semiconductor laser emits a laser beam, which is then collimated by the collimating lens 420 to generate a collimated beam, and an optical path is changed by 90° with the mirror 403. The beam enters the objective lens 401, which then focuses the beam onto the storage surface of an optical storage medium 412. The beam is then reflected on the surface of the storage medium, and reverses along the above optical path. The photodetectors in the integrated component 402 detects this beam, so that a signal recorded on the storage medium 412 can be read by the optical pickup 400.

Optical storage media tend to vertically vibrate when they are rotated. Therefore, the objective lens 401 has to be moved along the optical axis so that the storage surface of the optical storage medium 412 is always located in the depth of field of laser beam L1 converged by the objective lens 401. Besides, eccentricities in the rotation of the optical storage medium 412 make it also necessary to reposition the laser beam L1 so that it correctly follows a track on the optical storage medium 412. Accordingly, an optical pickup is required to have an adjusting function and an error detecting function for having the laser beam correctly focused on the storage medium, and for having the laser beam correctly follow a track.

Therefore, the photodetector in the integrated component 402 detects a focusing error and a tracking error by receiving the return light, and suitably controls currents supplied to the coils 450. Lorenz forces, generated by the magnetic field of the magnet 411 attached to the yoke 410 and the current going through the coils 405, move the objective lens 401 in a focusing direction and a tracking direction. As a result, the optical pickup 400 can accurately perform a write onto and a read from the optical storage medium 412.

However, in the optical pickup that uses the above-described conventional objective lens driver, the integrated component 402, collimator lens 420 and mirror 403 are fixed over the optical base 409, and only the objective lens 401 is moved so as to adjust the focus position and follow the track. Therefore, a displacement is generated between the chief rays of the laser beam emitted from the semiconductor laser and the optical axis of the objective lens 401. Due to this displacement, in the conventional optical pickup shown in FIG. 7, a lens aberration, a reduction in RIM strength or the like are generated. As a result, precision of the optical pickup 400 for a write onto and a read from the optical storage medium 412 decreases. Herein, both the accuracy of writing the information storage signal to the optical storage medium and that of reading the information storage signal to the optical storage medium will be collectively and simply called "optical reading accuracy".

In order to solve the above-described problems, not only an objective lens but also a semiconductor laser and photodetectors are mounted in a moving part so that the positional relationship of these optical components is always fixed, thereby preventing optical displacements. The optical pickup including the moving part equipped with a plurality of optical elements as described above will be herein called an "integrated optical pickup".

The present inventors have already disclosed an exemplary integrated optical pickup, such as one described above, in Japanese Unexamined Patent Publication No. 2001-344783. This integrated optical pickup includes a movable part equipped with optical elements such as a semiconductor laser and an objective lens, and the movable part is supported by a fixed part via a plurality of supporting members in a manner that allows the movable part to move in both the focusing and the tracking directions. Furthermore, in this optical pickup, at least two of the plurality of supporting members are conductive in order to supply drive currents to the semiconductor laser.

This integrated optical pickup prevents the displacement, and therefore, the optical characteristic of this optical pickup is improved as compared with the optical pickup shown in FIG. 7.

SUMMARY OF THE INVENTION

However, the conventional integrated optical pickup does not easily dissipate heat, and is not suitable for higher power.

The semiconductor laser and photodetectors generate heat during operation and cause temperature increase. In addition to this, the conventional integrated optical pickup dissipates the heat, generated in the semiconductor laser and photodetectors, mainly via air, and therefore, the temperature of the movable part substantially increases during operation. Consequently, the internal quantum efficiency of the semiconductor laser is reduced, and a desired laser power might not be obtained. This becomes more serious in using a high-power semiconductor laser.

In view of the above-described problems, the present invention has been made and its object is to provide an optical pickup that can easily and surely dissipate the heat generated by a semiconductor diode.

An inventive optical pickup includes: a base; a movable part having an objective lens, a laser diode and photodetectors; and a heat dissipating medium provided in a gap between the laser diode and the base.

In such an arrangement, the heat generated by the laser diode is dissipated to, for example, the base via the heat dissipating medium. Thus, overheating of the laser diode is suppressed during operation, and a laser beam can be stably outputted. As a result, it becomes possible to stably reading information from and writing information on an optical storage medium.

In one embodiment, the optical pickup may further include a first yoke provided on the base, and the heat dissipating medium may be in a gap between the first yoke and the laser diode. Thus, the heat propagated from the laser diode can be dissipated via the first yoke.

In another embodiment, the heat dissipating medium may be a fluid, and a region having a different wettability to the heat dissipating medium may be formed in a portion of the laser diode which faces the base. Thus, since the heat dissipating medium is held at a region having a high wettability, the outflow of the heat dissipating medium can be prevented.

In still another embodiment, the heat dissipating medium may be deformed in accordance with the motion of the movable part. Thus, even when the movable part is moved in a focusing direction and a tracking direction, it is possible to dissipate the heat generated by the laser diode without sacrificing the motion of the movable part.

In still yet another embodiment, the heat dissipating medium may be a ferrofluid. Thus, the efficiency of heat dissipation is considerably improved as compared with the case where the heat dissipating medium is not provided, and in addition, the heat dissipating medium can be held at a desired position by using a magnet or the like. Furthermore, a magnetic circuit is formed with the magnet and the first yoke, for example, so that the leakage of magnetic flux can be reduced.

In another embodiment, the heat dissipating medium may be held by magnetic field. Thus, the possibility of scattering of the heat dissipating medium is reduced.

In still another embodiment, the heat dissipating medium may be viscous. Thus, it is possible to dissipate the heat generated in the laser diode without sacrificing the movement of the movable part. Moreover, it becomes possible to achieve the damping effect of absorbing unneeded mechanical resonance during operation. Therefore, a damping gel that had to be conventionally provided at the fixed part, for example, can be omitted, thereby enabling the size reduction of the device.

In still yet another embodiment, the optical pickup may further include: second yokes provided on both sides of the movable part; a magnet held at each of the second yokes; and a coil provided at a distance from the associated magnet, wherein the heat dissipating medium may also be provided between the magnets and the coils. Thus, it is possible to more efficiently dissipate the heat generated in each coil, and the heat propagated via the heat dissipating medium. Besides, it is possible to achieve the damping effect of absorbing unneeded mechanical resonance during operation.

DESCRIPTION OF THE PREFERRED EMBODIMENTS

Hereinafter, an embodiment of the present invention will be described with reference to the accompanying drawings.

(Embodiment of the Invention)

Figure 1:
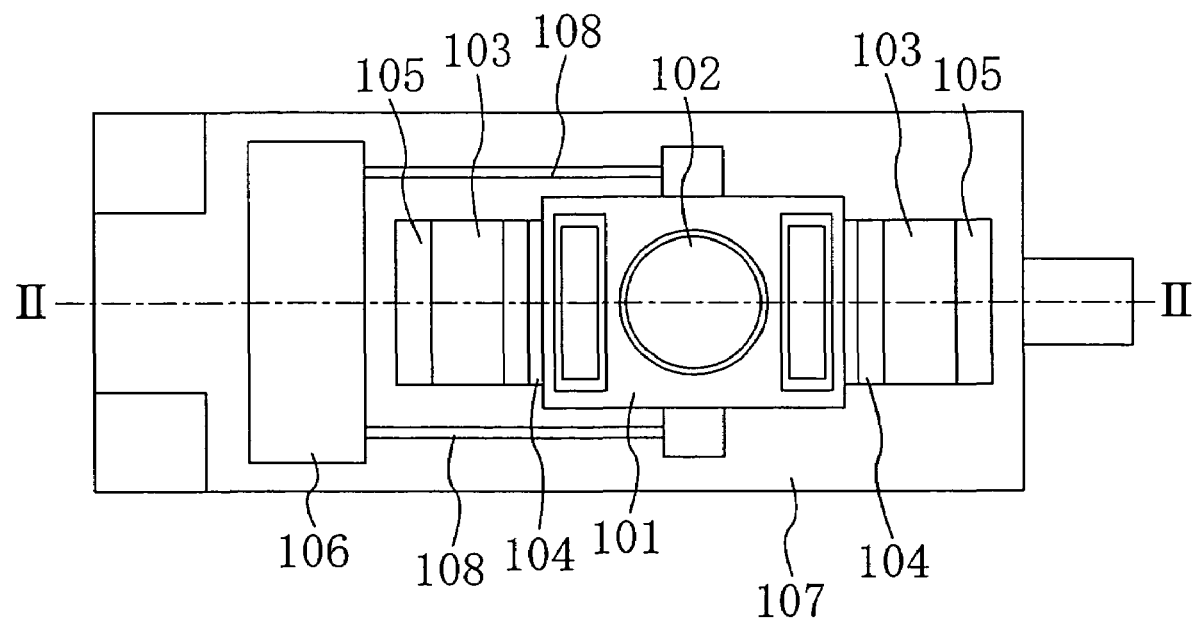
FIG. 1 is a plan view of an optical pickup according to an embodiment of the present invention as viewed from above.
Figure 2:
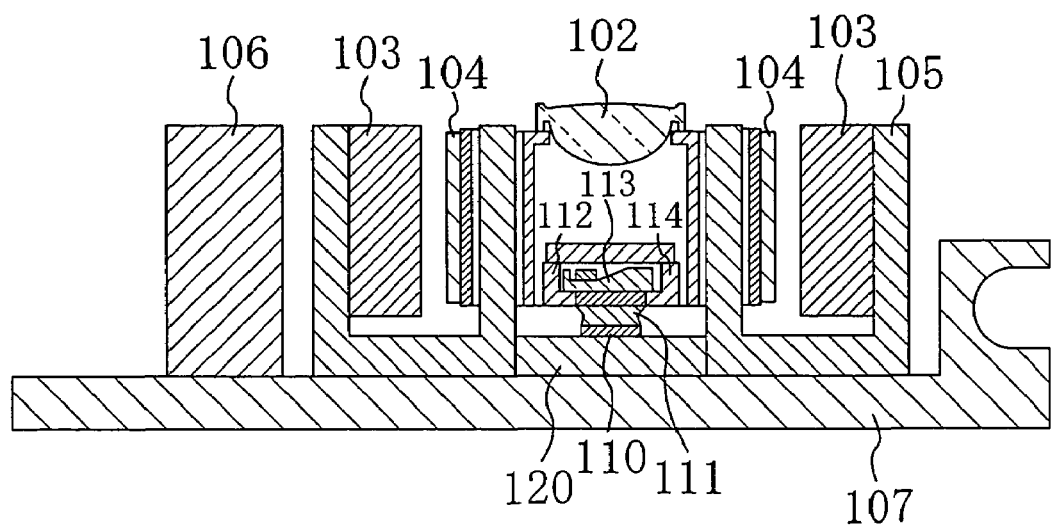
FIG. 2 is a cross-sectional view of the optical pickup shown in FIG. 1, which is taken along the line II—II.

FIG. 1 is a plan view of an optical pickup according to an embodiment of the present invention as viewed from above, and FIG. 2 is a cross-sectional view of the optical pickup shown in FIG. 1, which is taken along the line II—II.

The optical pickup of the present embodiment shown in FIGS. 1 and 2 includes: a base 107; a movable part 101; a fixed part 106; yokes 105; and a plurality of supporting members 108. The movable part 101, fixed part 106 and yokes 105 are provided over the base 107. And the plurality of supporting members 108 connect the movable part 101 to the fixed part 106 to each other, and support the movable part 101.

The movable part 101 is provided with: a hologram element 112; and a package 114 equipped with a laser/photodetectors integrated element 113 in which a semiconductor laser 113a and photodetectors 113b (see FIG. 3) are integrated. The movable part 101 is provided, at its upper portion, with an objective lens 102 for concentrating a laser beam, emitted from the laser diode (semiconductor laser 113a), on an optical disk (not shown). As shown in FIG. 1, the objective lens 102 is provided at the approximate center portion of the movable part 101 as viewed from above. It should be noted that the movable part 101 is supported by the plurality of supporting members 108 such that the movable part 101 can be moved in a tracking direction and a focusing direction.

The yokes 105 are provided on both sides of the movable part 101, and are each formed into a U-shape whose upper and lateral portions are opened. Each yoke 105 is provided, at its inner wall, with a coil 104 and a magnet 103 for driving of the movable part 101 in the focusing and tracking directions. Although another yoke 120 is provided between the movable part 101 and the base 107 in the example shown in FIG. 2, the yoke 120 is not provided in some cases. Furthermore, the yokes 105 and the yoke 120 are made of a magnetic material such as metal. Although the yokes 105 and the yoke 120 are provided as a continuous body, the yokes, provided on both sides of the movable part 101, and another yoke, provided between the movable part 101 and the base 107, are identified by different reference numerals, i.e., 105 and 120, respectively, for the sake of simplicity and convenience of the description.

The optical pickup of the present embodiment is characterized in that a deformable heat dissipating medium 111 having a thermal conductivity higher than that of air (e.g., a gas mixture of oxygen and nitrogen) is provided between the yoke 120 and the movable part 101. A detailed description will be made about this with reference to FIG. 3.

Figure 3:
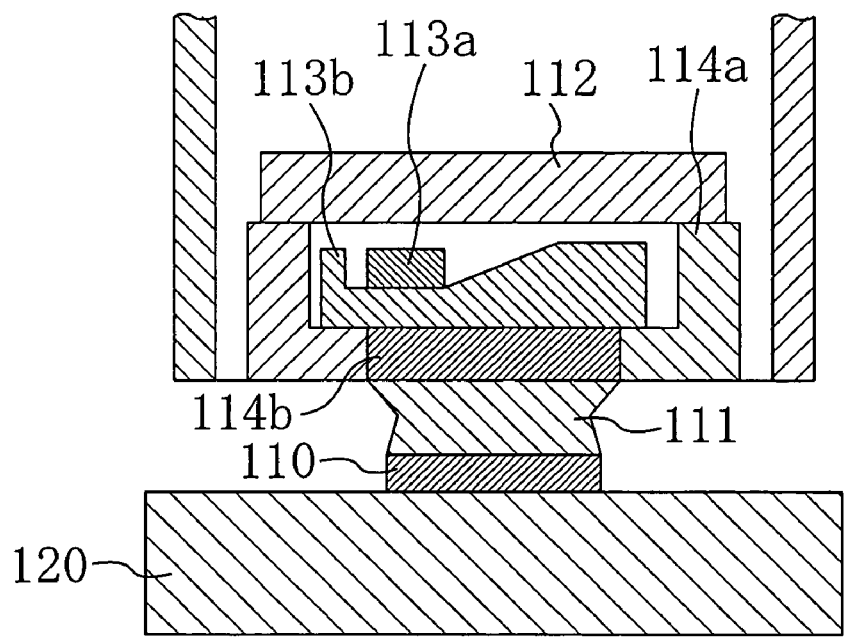
FIG. 3 is a cross-sectional view of the optical pickup according to the present embodiment in which the vicinity of a laser/photodetectors integrated element is enlarged.

FIG. 3 is a cross-sectional view of the optical pickup according to the present embodiment in which the vicinity of the laser/photodetectors integrated element 113 is enlarged. As shown in FIG. 3, a magnet, for example, is provided on the yoke 120, and a ferrofluid, which is the heat dissipating medium 111, is held on the magnet 110. The ferrofluid consists mainly of a lipophilic and viscous liquid, and is a liquid in which ferromagnetic ultrafine particle such as high-concentration magnetite is stably dispersed, with the thermal conductivity of the liquid higher than that of air or water. Furthermore, the package 114 is provided, at its lower portion, with a package resin section 114a made of resin and a package metal section 114b made of metal. The package metal section 114b is in contact with the ferrofluid (i.e., the heat dissipating medium 111). By providing the magnet 110 and the package metal section 114b, a magnetic field is formed in a gap between the magnet 110 and the package metal section 114b, and therefore, the ferrofluid is held therebetween without being scattered. The package metal section 114b may be made of a material other than metal having a high thermal conductivity.

In addition, a surface treatment, for example, is carried out such that the wettability of the package metal section 114b to the ferrofluid becomes higher than that of the package resin section 114a to the ferrofluid, thus preventing the scattering of the ferrofluid with certainty and limiting the contact area of the ferrofluid. In this case, since the ferrofluid consists mainly of a lipophilic liquid, it is sufficient that a treatment is carried out so as to make the package metal section 114b lipophilic.

In such an arrangement, since the heat generated in the laser/photodetectors integrated element 113 can be dissipated to the outside of the movable part 101 (i.e., toward the yoke 120) via the package metal section 114b and the heat dissipating medium 111, it is possible to prevent overheating of the laser/photodiode integrated element 113. As a consequence, the optical pickup of the present embodiment can be operated with stability, in particular, in the case where the laser diode is a high-power one.

Further, since the heat dissipating medium 111 is a viscous ferrofluid, it is possible to dissipate the heat, generated in the laser/photodetectors integrated element 113, without sacrificing the focusing and tracking motions of the movable part 101. Furthermore, since the ferrofluid is viscous, it is possible to achieve the damping effect of absorbing unneeded mechanical resonance during operation. Therefore, a damping gel (not shown) that had to be conventionally provided at the fixed part, for example, can be omitted, thereby enabling the size reduction of the device. Moreover, the ferrofluid can be held between the movable part 101 and the magnet 110 by utilizing the fact that the ferrofluid exhibits magnetism, and therefore, the use of the ferrofluid is preferable.

However, as the heat dissipating medium 111, other material may alternatively be used as long as it has a thermal conductivity higher than that of air and can be deformed with the motion of the movable part 101. For example, an elastic body such as a spring, mercury, liquid crystal or the like may be used as the heat dissipating medium 111.

Hereinafter, the operation of the inventive optical pickup implemented as described above will be described with reference to FIGS. 1 and 2.

First, during storage or reproduction of the optical disk, a control current from a servo circuit (not shown) flows to each coil 104, the movable part 101 is moved in the focusing direction and the tracking direction, a laser beam passed through the objective lens 102 is concentrated on the disk surface, and then a signal stored on the optical disk is detected. In this case, although the laser/photodetectors integrated element 113 generates heat as mentioned above, the generated heat is transmitted to the base 107 via the heat dissipating medium 111, magnet 110 and yoke 120 in this order, and as a result, the heat is efficiently dissipated.

First Modified Example of Present Embodiment

Figure 4:
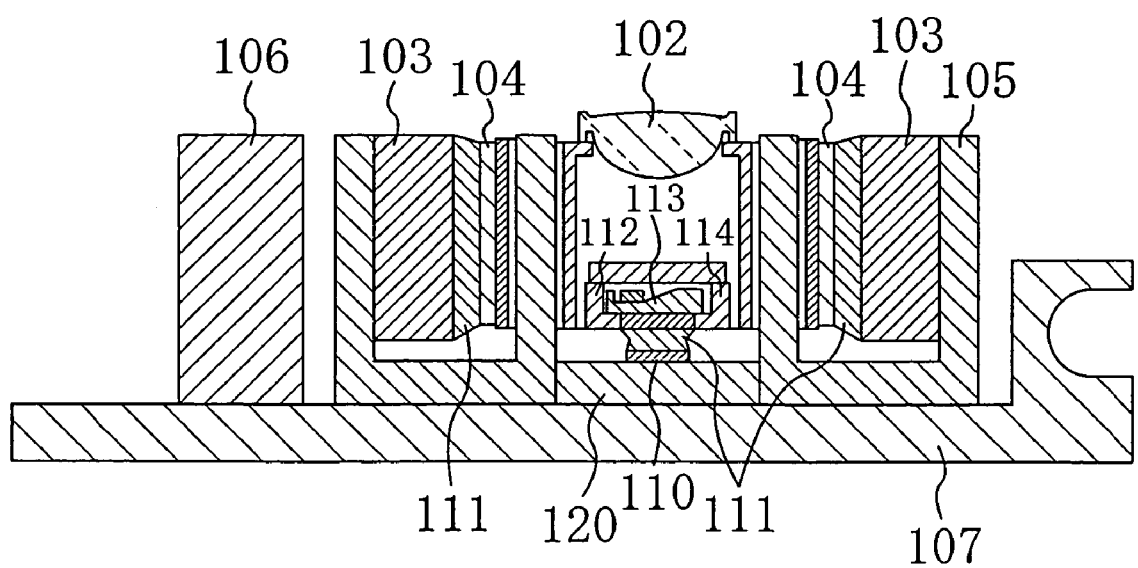
FIG. 4 is a cross-sectional view showing an optical pickup according to a first modified example of the present embodiment.

FIG. 4 is a cross-sectional view showing an optical pickup according to a first modified example of the present embodiment. As shown in FIG. 4, the optical pickup according to the present modified example differs from the optical pickup of the present embodiment only in structure inside the yokes 105, and therefore, only this point will be described below.

In the optical pickup of the present modified example, the heat dissipating medium 111 is also provided in a gap formed between the magnet 103 and coil 104 within each yoke 105. Thus, it becomes possible to dissipate the heat generated in each coil 104 and the heat propagated from the laser/photodetectors integrated element 113 via the yokes 120 and 105 at an efficiency higher than that of the conventional optical pickup. In particular, if a ferrofluid is utilized as the heat dissipating medium 111, not only the efficiency of heat dissipation is improved, but also the magnetic resistances of the magnetic circuits, each made up of the yoke 105, magnet 103 and coil 104, are reduced so that leakage of magnetic flux is decreased, thus making it possible to form the powerful magnetic circuit. Therefore, in the optical pickup of the present embodiment, it is also possible to improve the accuracy during the movement of the movable part 101.

Although the laser diode and the photodetectors are provided as a single semiconductor element in the optical pickup of the present embodiment, the laser diode and the photodetectors may alternatively be provided as independent elements. In that case, it is sufficient that the package of the laser diode is provided with a metal section so as to prevent the laser diode from being affected by the heat generated therein.

Other Modified Examples of Present Embodiment

Figure 5:
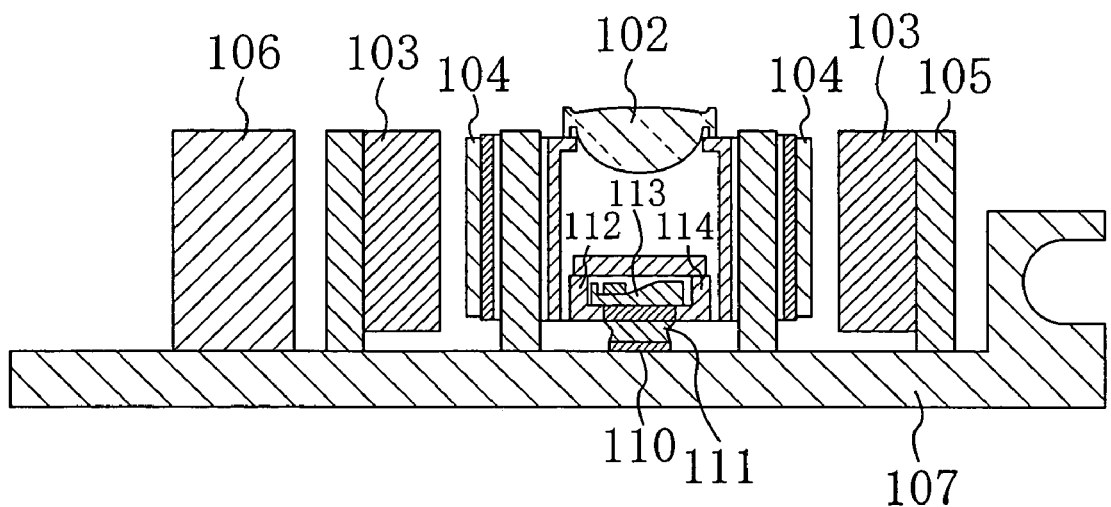
FIG. 5 is a cross-sectional view showing an optical pickup according to a second modified example of the present embodiment.
Figure 6:
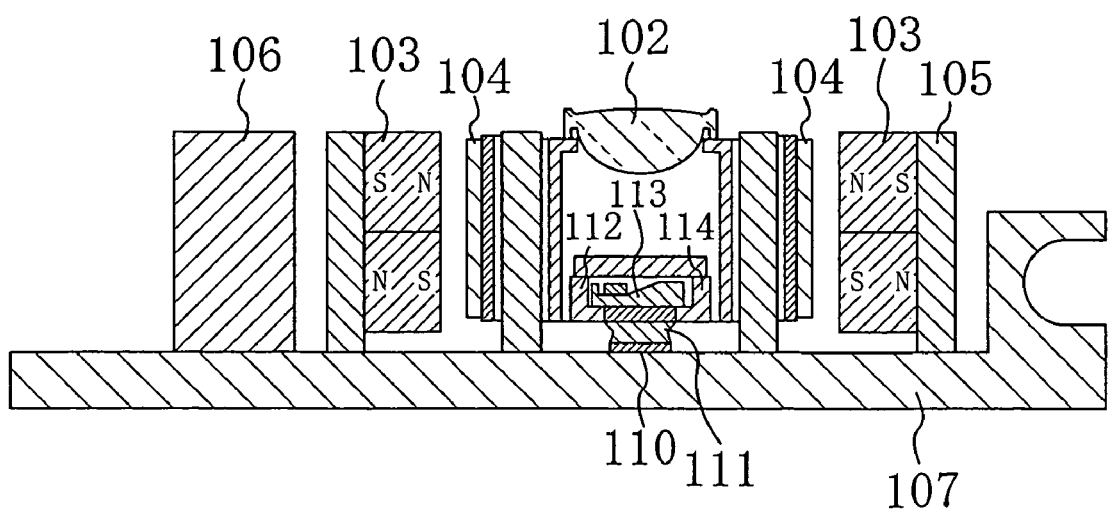
FIG. 6 is a cross-sectional view showing an optical pickup according to a third modified example of the present embodiment.
Figure 7:
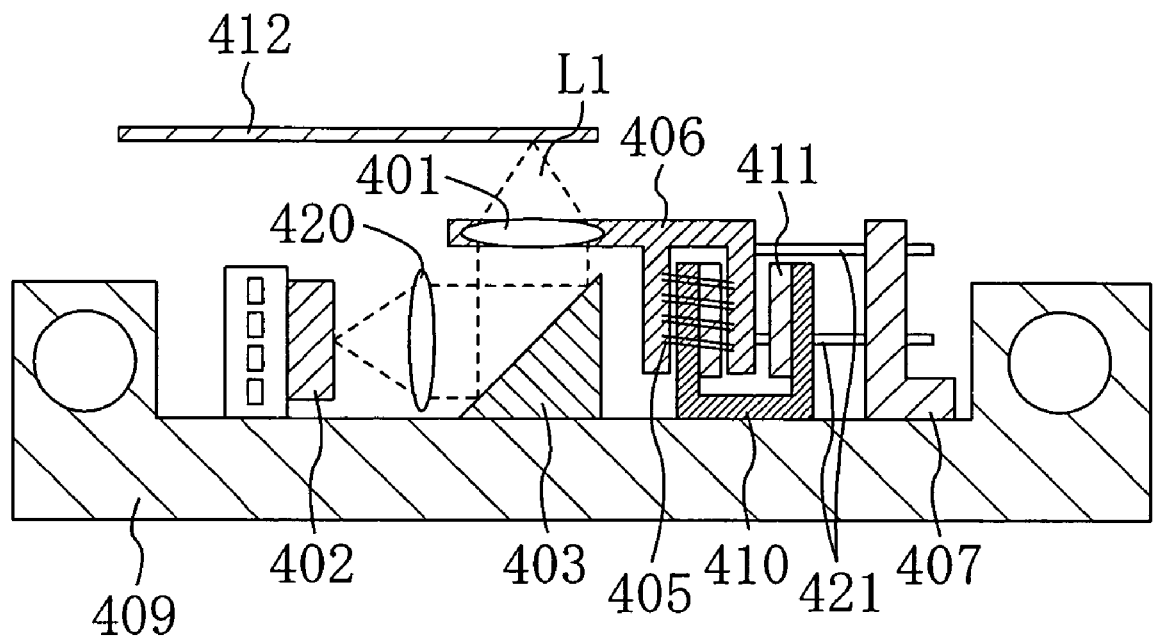
FIG. 7 is a longitudinal cross-sectional view showing the arrangement of a conventional optical pickup.

FIG. 5 is a cross-sectional view showing an optical pickup according to a second modified example of the present embodiment, and FIG. 6 is a cross-sectional view showing an optical pickup according to a third modified example of the present embodiment.

The optical pickups according to the second and third modified examples each differ from the optical pickup shown in FIGS. 1 and 2 in the location of each magnet 103 and each coil 104 and the shape of each yoke 105, for example. Described below is how the present embodiment is modified in each of the second and third modified examples.

First, as shown in FIG. 5, in the optical pickup according to the second modified example, the yoke 120 is omitted, and the magnet 110 is directly provided on the base 107. Further, the yokes 105 provided on both sides of the movable part 101 each have a shape that is devoid of its bottom unlike the yokes 105 shown in FIG. 1. Furthermore, the coil 104 is provided on both side walls of the movable part 101, while the magnet 103 is provided on an inner surface of each yoke 105 at an appropriate distance from the associated coil 104.

By providing the magnet 110 directly on the base 107 as described above, the heat, generated in the laser/photodetectors integrated element 113, can be efficiently dissipated to the base 107.

Besides, in the optical pickup according to the third modified example shown in FIG. 6, the magnet 110 is provided directly on the base 107 like the second modified example. In this example, however, the yokes 105 are provided on both sides of the movable part 101. Furthermore, the coils 104 are provided on both side walls of the movable part 101, while the magnets 103 are each provided on a surface of the wall of each yoke 105 which is close to the movable part 101. The upper and lower parts of each magnet 103 have opposite magnetic poles.

Even in such an arrangement, since the magnet 110 is provided directly on the base 107, the heat, generated in the laser/photodetectors integrated element 113, can be efficiently dissipated to the base 107.

What is claimed is:

1. An optical pickup comprising:
   a base;
   a movable part having, an objective lens, a laser diode, and photodetectors; and
   a heat dissipating medium provided in a gap between the laser diode and the base,
   wherein the device further comprises a first yoke provided on the base, and
   wherein the heat dissipating medium is provided in a gap between the first yoke and the laser diode.

2. The optical pickup of claim 1, wherein the heat dissipating medium is deformed in accordance with the motion of the movable part.

3. The optical pickup of claim 1, wherein the heat dissipating medium is a ferrofluid.

4. The optical pickup of claim 3, wherein the heat dissipating medium is supported by magnetic field.

5. The optical pickup of claim 1, wherein the heat dissipating medium is viscous.

6. An optical pickup comprising:
   a base;
   a movable part having, an objective lens, a laser diode, and photodetectors; and
   a heat dissipating medium provided in a gap between the laser diode and the base,
   wherein the heat dissipating medium is a fluid, and
   wherein a region having a different wettability to the heat dissipating medium is formed in a portion of the laser diode which faces the base.

7. An optical pickup comprising:
   a base;
   a movable part having, an objective lens, a laser diode, and photodetectors; and
   a heat dissipating medium provided in a gap between the laser diode and the base,
   wherein the device further comprises second yokes provided on both sides of the movable part,
   wherein the second yokes with magnets are connected to the base,
   wherein coils are mounted on the movable part, and
   wherein the heat dissipating medium is also provided between the magnets and the coils.

* * * * *